US012752571B2

(12) United States Patent
Liu

(10) Patent No.: US 12,752,571 B2
(45) Date of Patent: Oct. 6, 2026

(54) OPENING-PREFABRICATED CARBON FIBER SPOKE AND METHOD FOR PREPARATION THEREOF

(71) Applicant: Xiamen Carbonwing Composite Technology Co., Ltd., Xiamen (CN)

(72) Inventor: Wurui Liu, Xiamen (CN)

(73) Assignee: Xiamen Carbonwing Composite Technology Co., Ltd., Xiamen (CN)

( * ) Notice: Subject to any disclaimer, the term of this patent is extended or adjusted under 35 U.S.C. 154(b) by 422 days.

(21) Appl. No.: 18/570,813

(22) PCT Filed: Apr. 22, 2022

(86) PCT No.: PCT/CN2022/088480
§ 371 (c)(1),
(2) Date: Dec. 15, 2023

(87) PCT Pub. No.: WO2022/228307
PCT Pub. Date: Nov. 3, 2022

(65) Prior Publication Data

US 2024/0198722 A1 Jun. 20, 2024

(30) Foreign Application Priority Data

Apr. 28, 2021 (CN) ......................... 202110466188.9

(51) Int. Cl.
*B60B 1/04* (2006.01)
*B60B 1/02* (2006.01)

(52) U.S. Cl.
CPC ............ *B60B 1/044* (2013.01); *B60B 1/0246* (2013.01); *B60B 1/042* (2013.01); *B60B 1/041* (2013.01);

(Continued)

(58) Field of Classification Search
CPC ......... B60B 1/044; B60B 1/042; B60B 1/043; B60B 1/0261
See application file for complete search history.

(56) References Cited

U.S. PATENT DOCUMENTS 5,110,190 A * 5/1992 Johnson .................. B60B 1/003 301/58
5,779,323 A 7/1998 Burrows (Continued)

FOREIGN PATENT DOCUMENTS

CN 107839402 A 3/2018
CN 107972403 A 5/2018

(Continued)

OTHER PUBLICATIONS

International Search Report cited in PCT/CN2022/088480 mailed Jul. 27, 2022, 7 pages.

(Continued)

*Primary Examiner* — Jason R Bellinger
(74) *Attorney, Agent, or Firm* — Cooper Legal Group, LLC

(57) ABSTRACT

The present invention discloses a carbon fiber spoke and a method for preparing the same. The carbon fiber spoke includes: a spoke body made of carbon fiber, a nipple, and a nipple head. Both ends of the spoke body are a first fixed connector and a second fixed connector. The nipple is sleeved on the second fixed connector of the spoke body. A forked part of the second fixed connector is provided with a wedge pin. According to the present invention, a slope is formed at both ends of the spoke body, and the two ends are increasingly tight under an action of a pulling force, which greatly improves a tensile strength.

10 Claims, 6 Drawing Sheets

(52) U.S. Cl.
CPC . *B60B 2310/318* (2013.01); *B60B 2360/3416* (2013.01)

(56) References Cited

U.S. PATENT DOCUMENTS

| | | | | | |
|---|---|---|---|---|---|
| 6,036,281 | A * | 3/2000 | Campbell | B60B 5/02 | 301/58 |
| 7,988,240 | B2 * | 8/2011 | Lubecki | B60B 9/26 | 301/59 |
| 8,985,707 | B1 * | 3/2015 | Connolly | B60B 1/044 | 301/58 |
| 8,985,708 | B2 * | 3/2015 | Connolly | B60B 1/042 | 301/58 |
| 10,808,799 | B2 * | 10/2020 | Campbell | B29C 45/14385 | |
| 12,479,233 | B2 * | 11/2025 | Liu | B60B 1/045 | |
| 2018/0022147 | A1 * | 1/2018 | Tien | B60B 1/006 | 301/104 |
| 2020/0376887 | A1 * | 12/2020 | Wang | B60B 1/046 | |
| 2025/0282172 | A1 * | 9/2025 | Ye | B60B 21/062 | |

FOREIGN PATENT DOCUMENTS

| | | | |
|---|---|---|---|
| CN | 207466241 | U | 6/2018 |
| CN | 113085437 | A | 7/2021 |
| CN | 214606894 | U | 11/2021 |
| DE | 102008046255 | B3 | 3/2010 |
| WO | 03020535 | A2 | 3/2003 |

OTHER PUBLICATIONS

Written Opinion cited inPCT/CN2022/088480 mailed Jul. 27, 2022, 9 pages.

* cited by examiner

OPENING-PREFABRICATED CARBON FIBER SPOKE AND METHOD FOR PREPARATION THEREOF

CROSS-REFERENCED TO RELATED APPLICATIONS

This application is a national stage entry under 35 U.S.C. § 371 of International Application No. PCT/CN2022/088480, filed on Apr. 22, 2022, which claims priority to Chinese Patent Application No. 202110466188.9, filed on Apr. 28, 2021. The disclosures of International Application No. PCT/CN2022/088480 and Chinese Patent Application No. 202110466188.9 are incorporated herein by reference in their entireties.

TECHNICAL FIELD

The present disclosure discloses a carbon fiber spoke and a method for preparing the same, is classified into the technical field of wheel accessory manufacturing according to an International Patent Classification Table (IPC).

BACKGROUND

In the current bicycle manufacturing industry, carbon fiber-based trend is increasingly apparent in respect of a frame, front fork, handle, seat bar, stand, and wheel of a bicycle, and even a crank, kettle frame, hub, spokes, and other components. All brands and factories optimize the weight of each component from design and manufacturing processes, to give full play to the light weight and high strength/rigidity of carbon fiber materials.

In a bicycle system, spokes are a bridge between a wheel rim and the hub. During use, one end of the spoke with a nipple head is connected to the hub, and one end of the spoke with threads is locked to the cap of the spoke, and is connected to the wheel ring. Currently, a mainstream manufacturing manner for the carbon spokes is to form a main body of the spokes by using a mold or in another manner, and then metal parts are bond to two ends of the spokes, so that the carbon a function of the spokes is provided. However, strength of the spokes manufactured in this way is affected by the stability of a bonding process. If a bonding area is small in design, a bonding strength is unstable. If the bonding area is large, weight of the metal parts used is large. If the spokes made in this way are extremely heavy, a final design significance for the spokes is not presented and the spokes are not accepted by the market.

Chinese document CN107972403A discloses a carbon fiber spoke, including a spoke body, a nipple, and a nipple head. Two end parts of the spoke body are both fixedly provided with fixed connectors. Outer circumferential faces of the fixed connectors are provided with a first tapered section and a first turned section that are small inside and big outside. An outer diameter of the first turned section is not greater than a largest outer diameter of the first tapered section. The nipple and the nipple head are both provided with penetrating mounting holes. Hole walls of the mounting holes are provided with a second turned section and a second tapered sections of which an inner diameter is gradually increased from near to far relative to the second turned section. The second turned section of the mounting hole is sleeved on the spoke body, and the second tapered section is sleeved on the fixed connector. An interface designed with a force-bearing structure is only a combination between an outer circumference of two ends of the spoke body and mounting hole walls of the nipple and nipple head. If bonding between the fixed washer and a pre-spoke body is not good, the nipple or nipple may be pulled out during test or use, and a security risk exists. In addition, it is required that a dimension for the material removal processing of the fixed connector is extremely accurate, and the processing is difficult. Otherwise, matching of the mounting holes of the nipple and the nipple head cannot meet requirements.

SUMMARY

In view of a shortages in existing technologies, the present disclosure provides a carbon fiber spoke, which is fixed in an inverted circular truncated cone fixing manner, greatly improving a tensile strength.

To achieve the foregoing objective, the present disclosure is implemented by using the following technical solutions:

A carbon fiber spoke is provided, including: a spoke body made of carbon fiber, a nipple that is connected to a wheel rim, and a nipple head that is connected to a hub. Both ends of the spoke body are a first fixed connector and a second fixed connector. The first fixed connector is provided with a diameter-expanded part, and the second fixed connector is provided with a forked part. The nipple and the nipple head are provided with penetrating mounting holes. The nipple head is sleeved on the first fixed connector of the spoke body, and the nipple is sleeved on the second fixed connector of the spoke body. The forked part of the second fixed connector is provided with a wedge pin.

Further, a cross-sectional shape of the spoke body between the two fixed connectors is circular, oval, or approximately diamond.

Further, the mounting hole of the nipple head includes a tapered hole part, a maximum inner diameter of the tapered hole part is not greater than a maximum outer diameter of the diameter expanded part, and under an action of a pulling force, the nipple head is combined to the spoke body more tightly.

Further, the spoke body is integrally formed and comprises the first fixed connector and a columnar body that extends forward, the diameter-expanded part of the first fixed connector is an inverted cone structure, and a maximum outer diameter of the inverted cone structure is 1.1-2 times a diameter of the columnar body.

Further, the forked part of the spoke body is a Y-shaped structure.

Further, the mounting hole of the nipple includes a tapered hole part.

Further, the spoke body, the nipple, and the nipple head are connected and fastened by adhesive.

The present disclosure provides a method for preparing a carbon fiber spoke. The method includes the following steps:

step 1: forming a carbon fiber spoke body by thermoforming, one end of the spoke body is an expanded part, and the other end of the spoke body is a forked part in a closed state;

step 2: sleeving a nipple head from a forked end of the carbon fiber spoke body, and placing the nipple head in place, so that an expanded end of the spoke body is inserted into the metal nipple head;

Step 3: sleeving a nipple from the forked end of the carbon fiber spoke body, apply the high-temperature resistant adhesive on the forked end of the carbon fiber spoke body, and then move the metal nipple in place;

step 4: applying the high-temperature resistant adhesive to a wedge pin and a part at which the forked end of the carbon fiber spoke body is bonded to the wedge pin;

step 5: pressing the wedge pin into the forked end of a carbon fiber spoke body, so that the forked end of the carbon fiber spoke body expands and compresses an inner surface of a gradient hole of the metal nipple; and step 6: heating an assembled spoke assembly in an oven to cure the adhesive.

In step 2, before the nipple head performs sleeving, the high-temperature resistant adhesive is applied to one end of the carbon fiber spoke body, so that the expanded part of the spoke body is further fastened to the nipple head by adhesive during cooperation.

In step 1, a "Y"-shaped carbon fiber spoke body is formed by direct thermoforming, one end of the spoke body provided with the slope is inserted into the nipple provided with a gradient hole, and the other end spreads the carbon fiber spoke by using the wedge pin, and fastens the nipple to the carbon fiber spoke body, and then performs bonding by using a high-temperature epoxy adhesive.

In the carbon fiber spoke body provided in the present disclosure, the carbon fiber spokes are formed directly without processing and slotting, so that a production procedure is simple, operation efficiency is high, and production costs are low, which is proper for mass production. A strength of bonding among the carbon fiber spoke body, the metal nipple, and the metal nipple head is high. This is because: a slope is formed at both ends of the spoke body, and the two ends are increasingly tight under an action of a pulling force, greatly improve a tensile strength; and the adhesive used is a high-strength epoxy structure adhesive, and a whole structure with an extremely high tensile force is formed. Therefore, the present has the following advantages in production: a simple production operation, high efficiency, and low costs.

DESCRIPTION OF EMBODIMENTS

Figure 1:
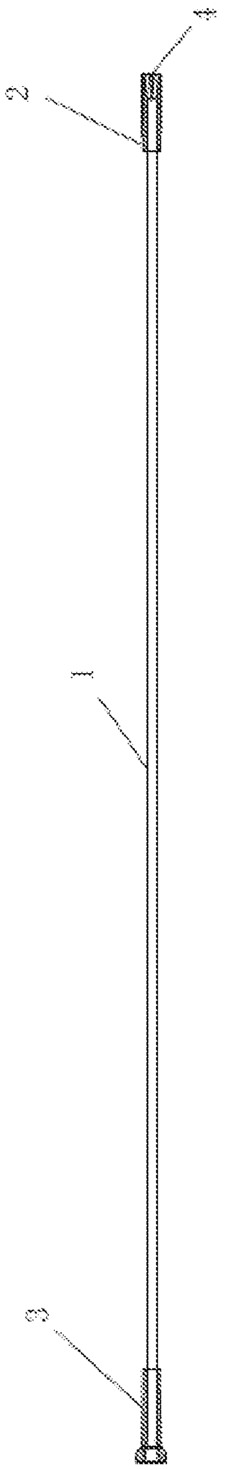
FIG. 1 is a schematic diagram according to an embodiment of the present disclosure.

The present disclosure is further described with reference to accompanying drawings.

Embodiments: Referring to FIG. 1 to FIG. 7, an carbon fiber spoke is provided, including a spoke body 1 made of carbon fiber, a nipple 2 that can cooperate with and connect to a wheel rim, and a nipple head 3 that can cooperate with and connect to a hub. Both ends of the spoke body 1 are a first fixed connector and a second fixed connector. The first fixed connector is provided with a diameter-expanded part 11, and the second fixed connector is provided with a forked part 12. The nipple 2 and the nipple head 3 are provided with penetrating mounting holes. The nipple head 3 is sleeved on the first fixed connector of the spoke body, and the nipple 2 is sleeved on the second fixed connector of the spoke body. The second fixed connector is provided with a wedge pin 4. A cross-sectional shape of the spoke body between the two fixed connectors may be circular, flat, oval, or approximately diamond, and is specifically designed according to actual requirements.

Figure 3:
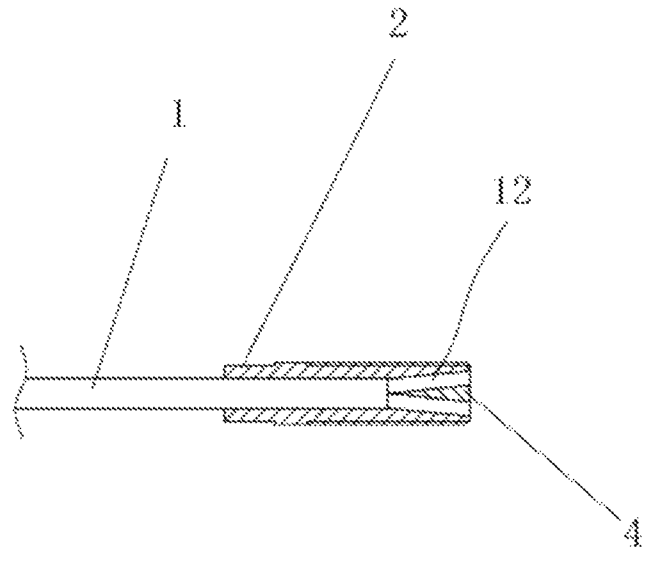
FIG. 3 is an enlarged diagram of cooperation between a nipple and a spoke body according to an embodiment of the present disclosure.
Figure 4:
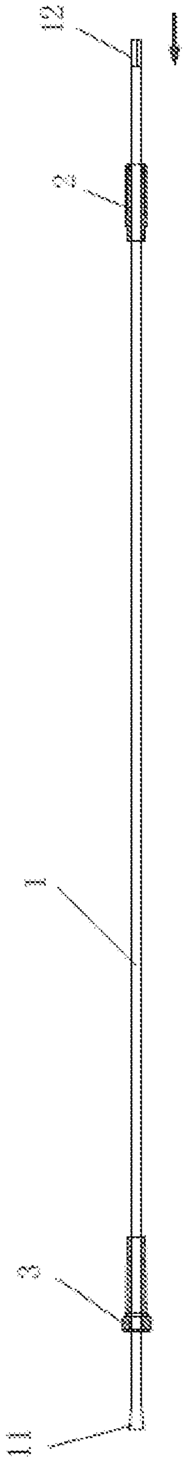
FIG. 4 is a schematic diagram of an assembly process of a nipple and a spoke body according to the present disclosure.

In an embodiment of this utility model, the spoke body 1 is formed integrally, one end of the spoke body 1 is formed as a first fixed connector, the other end is formed as a second fixed connector, and an intermediate position is formed as a columnar body. As shown in FIG. 3, the diameter-expanded part of the first fixed connector is an inverted cone structure. A maximum outer diameter D of the inverted cone structure is 1.1-2 times a diameter of the columnar body d, a ratio of D/d may be 1.2, 1.5, 1.6, 1.8, or the like. An aperture of a nipple head connected to the first fixed connector is adapted to the foregoing design.

Figure 2:
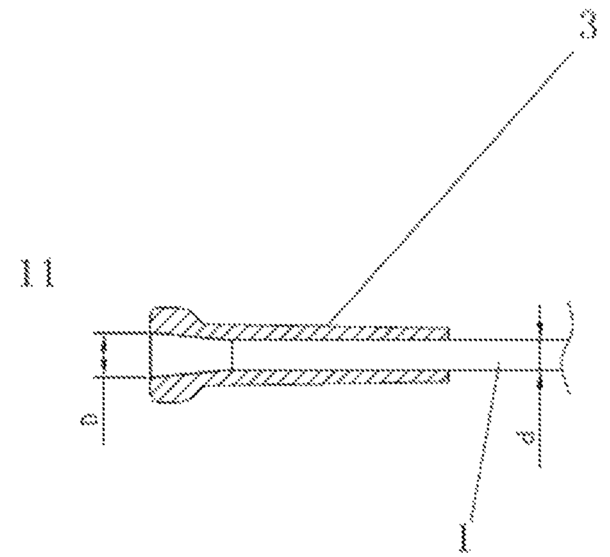
FIG. 2 is an enlarged diagram of cooperation between a nipple and a spoke body according to an embodiment of the present disclosure.
Figure 5:
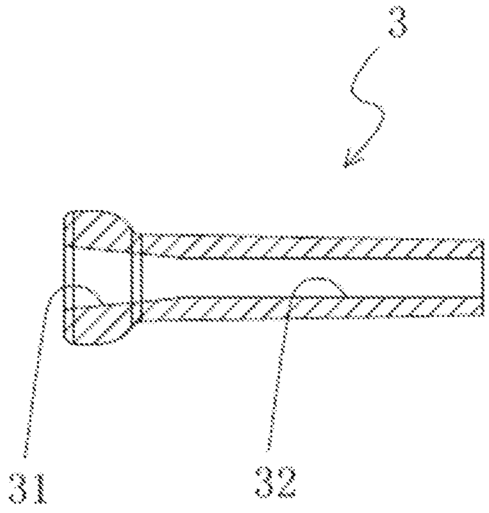
FIG. 5 is a schematic diagram of a nipple according to an embodiment of the present disclosure.
Figure 6:
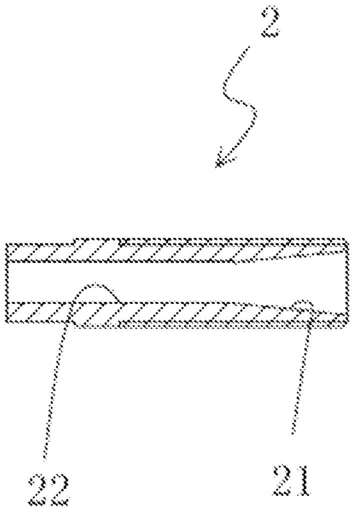
FIG. 6 is a schematic diagram of a nipple according to an embodiment of the present disclosure.

In an embodiment of the present disclosure, for example, in FIG. 1, FIG. 2, and FIG. 5, the mounting hole of the nipple head 3 includes a tapered hole part 31 and a straight hole part 32. The tapered hole part 31 cooperates with the diameter-expanded part 11. A maximum inner diameter of the tapered hole part 31 is not greater than a maximum outer diameter of the diameter-expanded part 11 (a maximum diameter position of the spoke body). Under an action of pulling force, the nipple head 3 is combined to the spoke body 1 more tightly. The maximum inner diameter of the tapered hole part 31 may be equal to or less than the maximum outer diameter of the diameter-expanded part. Certainly, the maximum inner diameter of the tapered hole part 31 may alternatively be greater than the maximum outer diameter of the diameter-expanded part. In this case, a minimum inner diameter of the tapered hole part is less than the maximum outer diameter of the diameter-expanded part, to ensure that the diameter-expanded part of the spoke body is clamped in the tapered hole part. For example, in FIG. 1, FIG. 3, and FIG. 6, the forked part of the spoke body 1 is of a Y-shaped structure, and when sleeved into the nipple head 3 and the nipple 2, the forked part of the spoke body 1 is in a closed state. The wedge pin 4 is inserted, the forked part is opened and is tightly engaged with the nipple. The mounting hole of the nipple 2 includes a tapered hole part 21 and a straight hole part 22, and the tapered hole part is located at an outer port of the mounting hole of the nipple 2.

To improve a binding force of the spoke, in an implementation of the present disclosure, the spoke body 1 is firmly connected to the nipple 2 and the nipple head 3 by using adhesive, and specific steps are disclosed in the following.

Figure 8:
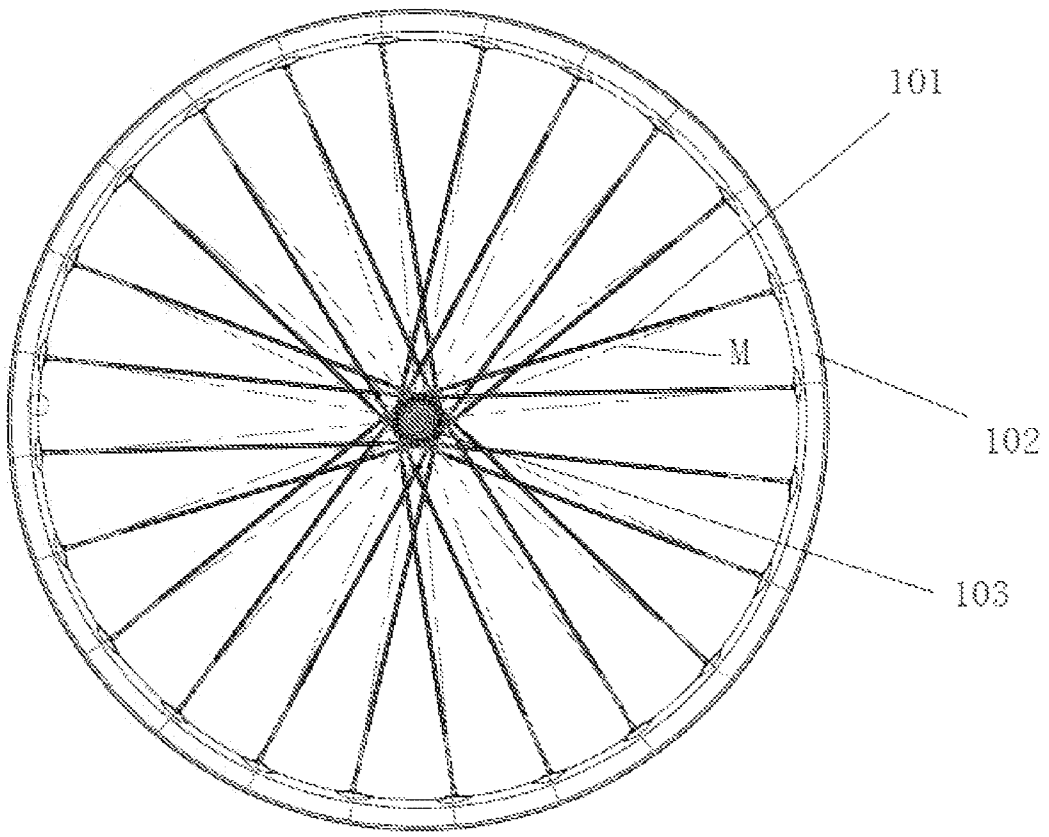
FIG. 8 is a diagram of a use state according to an embodiment of the present disclosure.

When the present disclosure is used, for example, in FIG. 8, an outer end of the carbon fiber spoke 101 is connected to the wheel rim 102, an inner end of the spoke is connected to the hub 103. The carbon fiber spoke 101 deviates from a radial connection line M of and outer end connection point of the spoke and a center of the hub.

Figure 7:
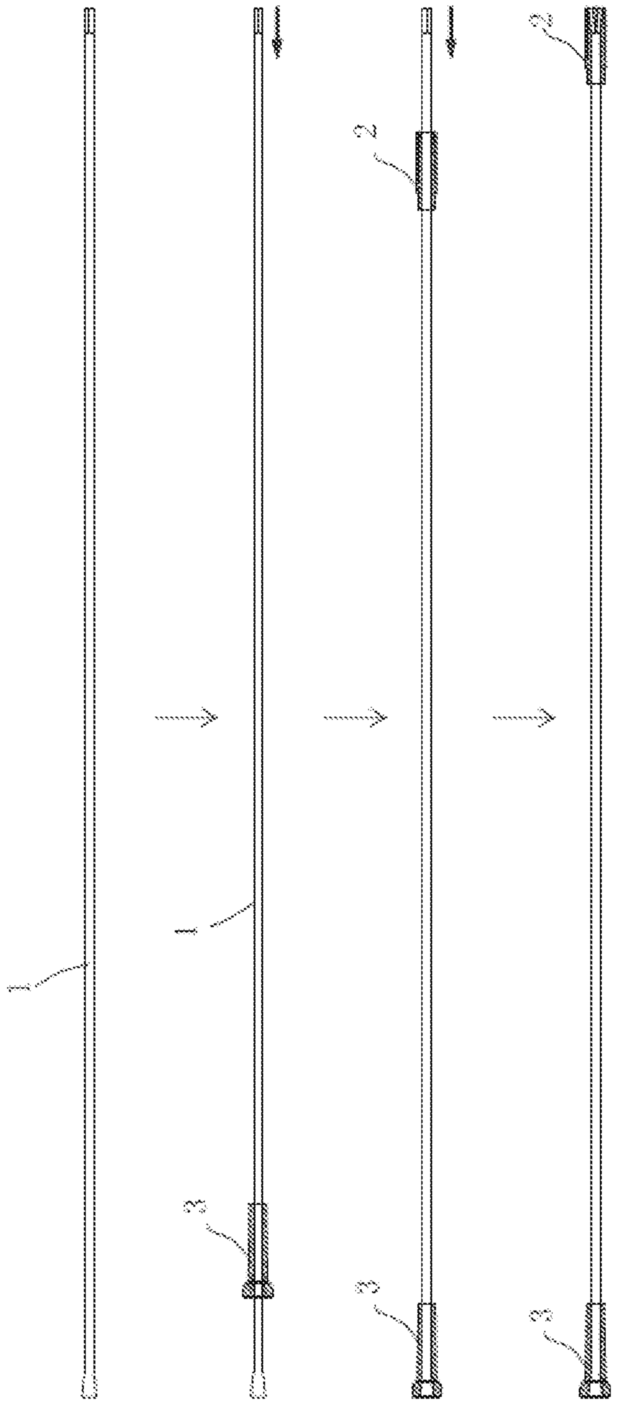
FIG. 7 is a process diagram according to an embodiment of the present disclosure.

The present disclosure provides a method for preparing an carbon fiber spoke. As shown in FIG. 7, the method includes the following steps:

Step 1: Form a "Y"-shaped carbon fiber spoke body by thermoforming. A size and shape of a middle part may be adjusted according to requirements. Shapes of two ends are shown in FIG. 7. In this case, a forked end is in a closed state;

Step 2: Apply a high-temperature resistant adhesive to one end of an extended part of the carbon fiber spoke body;

Step 3: Sleeve a metal nipple head from the forked end of the carbon fiber spoke body, and place the metal nipple head in place. As shown in FIG. 1, an end that is of the spoke body and that has a slope is inserted into the metal nipple head;

Step 4: Sleeve a metal nipple from the forked end of the carbon fiber spoke body, apply the high-temperature resistant adhesive on the forked end of the carbon fiber spoke body, and then move the metal nipple in place;

Step 5: Apply the high-temperature resistant adhesive to a wedge pin and a part at which the forked end of the carbon fiber spoke body is bonded to the wedge pin;

Step 6: Press the wedge pin into the forked end of a carbon fiber spoke body, so that the forked end of the carbon fiber spoke body expands and compresses an inner surface of a gradient hole of the metal nipple; and Step 7: Heat an assembled spoke assembly in an oven to cure the adhesive.

In an embodiment of the present disclosure, the "Y"-shaped carbon fiber spoke body is formed by direct thermoforming, one end of the spoke body 1 provided with the slope is inserted into the metal nipple head 3 provided with a gradient hole, and the other end spreads the carbon fiber spoke by using the wedge pin 4, and fastens the metal nipple 2 to the carbon fiber spoke body 1, and then performs bonding by using a high-temperature epoxy adhesive.

In an embodiment of the present disclosure, combination among the nipple 2, the nipple head 3, and the carbon fiber spoke body 1 form an inverted circular truncated cone fixing manner. Under an action of a pulling force, the bonding is increasingly tight, thereby greatly improving a tensile strength.

The following table shows comparison between the embodiments in the present disclosure and light metal spokes on the market.

| | | Length (mm) | Weight excluding weight of a nut (g) | Maximum breaking force (kgf) | Maximum fracture deformation (mm) |
|---|---|---|---|---|---|
| High-end lightweight metal spoke | 1 | 280 | 4.5 | 302.35 | 6.52 |
| | 2 | 280 | 4.4 | 305.80 | 6.25 |
| | 3 | 280 | 4.5 | 318.52 | 6.58 |
| | | avg. | 4.47 | 308.89 | 6.45 |
| Carbon fiber spoke in implementation of the present disclosure | 1 | 279 | 3.2 | 456.20 | 6.56 |
| | 2 | 280 | 3.2 | 442.32 | 6.84 |
| | 3 | 280 | 3.2 | 420.55 | 6.36 |
| | | avg. | 3.20 | 439.69 | 6.59 |
| Comparison of differences % | | | −28.4% | 42.3% | 2.1% |
| Advantages of the carbon spoke | 1. Approximately 30% lighter (lighter weight)<br>2. Fracture strength exceeds 40% (higher fracture strength)<br>3. Similar maximum fracture deformation | | | | |

The foregoing data is obtained from a test by a universal material tester. A test reference standard is ASTM D3039.

As described above, any modification or change made by a person skilled in the art by using the content of the technical content of the creation is within the scope of the creation, and is not limited to the embodiments.

The invention claimed is:

1. A carbon fiber spoke, comprising: a spoke body made of carbon fiber, a nipple connected to a wheel rim, and a nipple head connected to a hub, ends of the spoke body respectively have a first fixed connector and a second fixed connector, the first fixed connector is provided with a diameter-expanded part, the second fixed connector is provided with a forked part, the nipple and the nipple head are provided with penetrating mounting holes, the nipple head is sleeved on the first fixed connector of the spoke body, the nipple is sleeved on the second fixed connector of the spoke body, and the forked part of the second fixed connector is provided with a wedge pin.

2. The carbon fiber spoke according to claim 1, wherein a cross-sectional shape of the spoke body between the first fixed connector and the second fixed connector is circular, oval, or diamond.

3. The carbon fiber spoke according to claim 1, wherein the penetrating mounting hole of the nipple head comprises a tapered hole part, a maximum inner diameter of the tapered hole part is not greater than a maximum outer diameter of the diameter-expanded part.

4. The carbon fiber spoke according to claim 1, wherein the spoke body is integrally formed, the spoke body comprises a columnar body connected to the first fixed connector, the diameter-expanded part of the first fixed connector is an inverted cone structure, and a maximum outer diameter of the inverted cone structure is 1.1-2 times a diameter of the columnar body.

5. The carbon fiber spoke according to claim 1, wherein the forked part of the spoke body is a Y-shaped structure.

6. The carbon fiber spoke according to claim 5, wherein the penetrating mounting hole of the nipple comprises a tapered hole part.

7. The carbon fiber spoke according to claim 1, wherein the spoke body, the nipple, and the nipple head are connected and fastened by adhesive.

8. A method for preparing a carbon fiber spoke, comprising steps of:

step 1: forming a carbon fiber spoke body by thermoforming, a first end of the carbon fiber spoke body being an expanded part, and a second end of the carbon fiber spoke body being a forked part in a closed state;

step 2: sleeving a nipple head from a forked end of the carbon fiber spoke body, and placing the nipple head in place, so that an expanded end of the carbon fiber spoke body is inserted into the nipple head;

step 3: sleeving a nipple from the forked end of the carbon fiber spoke body, applying an adhesive on the forked end of the carbon fiber spoke body, and then moving the nipple in place;

step 4: applying the adhesive to a wedge pin and a part at which the forked end of the carbon fiber spoke body is bonded to the wedge pin;

step 5: pressing the wedge pin into the forked end of the carbon fiber spoke body, so that the forked end of the carbon fiber spoke body expands and compresses an inner surface of a gradient hole of the nipple; and step 6: heating an assembled spoke assembly in an oven to cure the adhesive.

9. The method for preparing the carbon fiber spoke according to claim 8, wherein in step 2, before the nipple head performs sleeving, the adhesive is applied to the first end of the carbon fiber spoke body, so that the expanded part of the carbon fiber spoke body is further fastened to the nipple head by the adhesive.

10. The method for preparing the carbon fiber spoke according to claim 8, wherein in step 1, the carbon fiber spoke body is "Y"-shaped, the first end of the carbon fiber spoke body is inserted into the nipple provided with the gradient hole, and the second end spreads the carbon fiber spoke body by using the wedge pin, and fastens the nipple to the carbon fiber spoke body, and bonding is performed by using an epoxy adhesive.

* * * * *